US008768006B2

(12) United States Patent
Subramanian et al.

(10) Patent No.: US 8,768,006 B2
(45) Date of Patent: Jul. 1, 2014

(54) HAND GESTURE RECOGNITION

(75) Inventors: Anbumani Subramanian, Karnataka (IN); Vinod Pathangay, Karnataka (IN); Dinesh Mandalapu, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 750 days.

(21) Appl. No.: 12/977,065

(22) Filed: Dec. 23, 2010

(65) Prior Publication Data
US 2012/0093360 A1   Apr. 19, 2012

(30) Foreign Application Priority Data
Oct. 19, 2010   (IN) .......................... 3084/CHE/2010

(51) Int. Cl.
*G06K 9/00* (2006.01)
*G06K 9/36* (2006.01)
*G09G 5/00* (2006.01)

(52) U.S. Cl.
USPC ........... 382/103; 382/107; 382/165; 382/291; 345/156

(58) Field of Classification Search
CPC ... G06F 3/017; G06F 3/011; G06F 17/30047; G06F 3/005; G06F 3/0488; G06F 3/014; G06F 3/0426; G06F 3/04815; G06F 3/04842; G06K 9/00355; G06K 9/00375; G06K 9/00201; G06K 9/00362; G06K 9/00389; G06T 2207/10024; G06T 7/0081; G06T 7/408; G06T 2207/30241; G06T 7/004; G06T 7/2046
See application file for complete search history.

(56) References Cited

U.S. PATENT DOCUMENTS

| | | | | |
|---|---|---|---|---|
| 5,912,721 A * | 6/1999 | Yamaguchi et al. | .......... | 351/210 |
| 6,115,482 A * | 9/2000 | Sears et al. | ..................... | 382/114 |
| 6,636,635 B2 * | 10/2003 | Matsugu | ....................... | 382/218 |
| 6,714,247 B1 * | 3/2004 | Numazaki et al. | ........... | 348/370 |
| 6,788,809 B1 * | 9/2004 | Grzeszczuk et al. | .......... | 382/154 |
| 7,095,401 B2 * | 8/2006 | Liu et al. | ....................... | 345/156 |
| 7,224,830 B2 * | 5/2007 | Nefian et al. | .................. | 382/154 |
| 7,274,803 B1 | 9/2007 | Sharma et al. | | |
| 7,650,014 B2 * | 1/2010 | Ikeda et al. | .................... | 382/103 |
| 7,940,960 B2 * | 5/2011 | Okada | ........................... | 382/103 |
| 8,194,921 B2 * | 6/2012 | Kongqiao et al. | ............. | 382/103 |
| 8,265,350 B2 * | 9/2012 | Torii et al. | ...................... | 382/118 |
| 8,649,559 B2 * | 2/2014 | Ahn et al. | ...................... | 382/103 |
| 2008/0244465 A1 | 10/2008 | Kongqiao et al. | | |
| 2009/0324008 A1 | 12/2009 | Kongqiao et al. | | |
| 2010/0329509 A1 * | 12/2010 | Fahn et al. | ..................... | 382/103 |
| 2011/0013807 A1 * | 1/2011 | Lee et al. | ....................... | 382/107 |
| 2011/0211754 A1 * | 9/2011 | Litvak et al. | ................... | 382/165 |

FOREIGN PATENT DOCUMENTS

KR   20000045611   7/2000

OTHER PUBLICATIONS

Zhenyao Mo; Ulrich Neumann, Real-time Hand Pose Recognition Using Low-Resolution Depth Images, University of Southern California, Computer Graphics and Immersive Technologies Lab, Jul. 25, 2000.

* cited by examiner

*Primary Examiner* — Manav Seth

(57) ABSTRACT

Systems, methods, and machine readable and executable instructions are provided for hand gesture recognition. A method for hand gesture recognition can include detecting, with an image input device in communication with a computing device, movement of an object. A hand pose associated with the moving object is recognized and a response corresponding to the hand pose is initiated.

15 Claims, 7 Drawing Sheets

POINTING

HAND SHAKE

OPEN PALM

FIST

THUMBS UP

THUMBS DOWN

DIGIT

HAND GESTURE RECOGNITION

RELATED APPLICATIONS

Benefit is claimed under 35 U.S.C. 119(a)-(d) to Foreign application Serial No. 3084/CHE/2010 filed in INDIA entitled "HAND GESTURE RECOGNITION" by Hewlett-Packard Development Company, L.P., filed on Oct. 19, 2010, which is herein incorporated in its entirety by reference for all purposes.

BACKGROUND

The modern communications era has brought about a tremendous expansion of wired and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase the ease of information transfer and convenience to users relates to simplifying human/machine interfaces. As the range of activities accomplished with a computer increases, new and innovative ways to provide an interface with a computer are sought.

The most common way by which a user interfaces with a computer has been by direct mechanical interaction. Examples of such man-machine-interface apparatus include keyboards, switches (e.g., buttons), wired and optical mice, track balls, optical pointing devices, touch-sensitive screens, infra-red remote controls, and more recently, position- and acceleration-sensing gaming controls moved in space (e.g., with a hand). Each allows a user to mechanically provide input to a computer via mechanical interaction (e.g., a touch event) involving a hardware device, with the mechanical interaction being subsequently converted into electronic signals.

Voice recognition systems can receive computer input without tactile mechanical manipulation of a hardware device, making use of sound waves to discern input information. Motion sensing devices have been used to provide a digital input such as the detection of a threshold quantity of motion that triggers responsive computing activities (e.g., alarming functionality). However, motion sensing devices have been rather indiscriminate in simply detecting existence of motion associated with a space monitored by the motion sensing device, rather than attempting to derive a further information from the detected motion.

DETAILED DESCRIPTION

Figure 1:
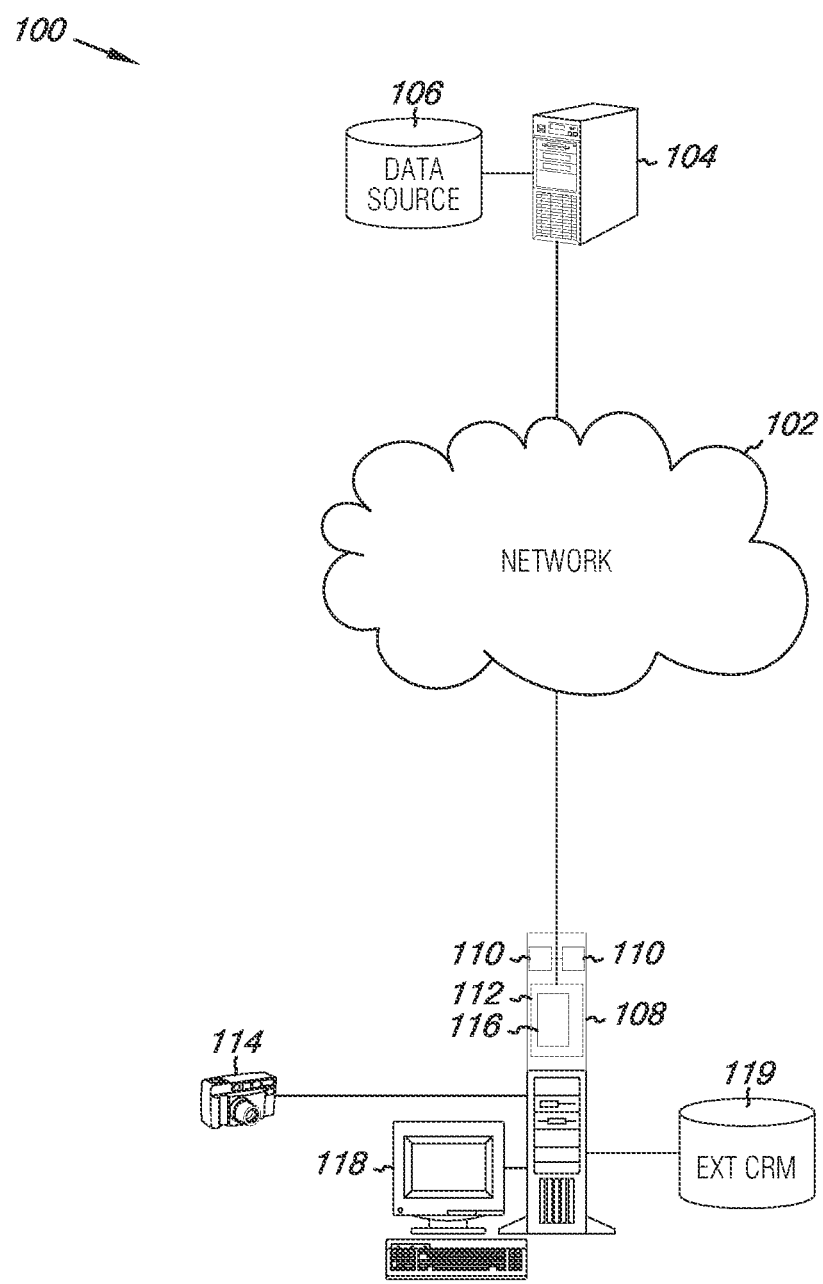
FIG. 1 illustrates a block diagram of an example of a hand gesture recognition system according to the present disclosure.

The present disclosure is directed to a hand gesture recognition method which can be used in human-machine (e.g., computing device) interactions. Using the approach(es) described herein, a gesture recognition system can be made to respond only to gestures made with hands, and to ignore other movement within a scene, such as those gestures that are not made with the hand or that are not made by a particular hand pose. That is, the gesture recognition system of the present disclosure can be made responsive only to movement performed by predefined hand pose(s) and unresponsive to movement performed by other (e.g., unknown to the system) hand pose(s).

Embodiments of the present disclosure may include methods, systems, and machine readable and executable instructions and/or logic. An example method for hand gesture recognition can include detecting, with an image input device in communication with a computing device, movement of an object. A hand pose associated with the moving object is recognized and a response corresponding to the hand pose is initiated. The color of the object may be evaluated with respect to a range of skin colors. Recognition of a hand gesture from the object is enabled if the color of the object is evaluated to be within the range of skin colors, the hand gesture including the hand pose and a trajectory of the hand pose.

Improvements in human/machine interface can enhance user enjoyment and open possibilities for user interface with computing devices in environments that may otherwise have presented challenges for effective computer control. Hand gesture recognition can, for example, improve the naturalness and facility of communication. However, many gesture analysis mechanisms may suffer from difficulties in detecting or tracking gestures in unconstrained environments, such as with changing or certain lighting configurations and/or environments, or with certain backgrounds that may present challenges in gesture tracking such as in environments that include other (e.g., non-hand) movement. The present disclosure successfully addresses these previously limiting considerations.

In previous approaches to gesture recognition systems, gestures are recognized by detection of a moving object in front of the system. A detected moving object was presumed to be a hand. While this design is natural and easy, a system based on such a default assumption can be subject to responding to other moving objects even if they are not a user's hand(s). That is, an image recognition methodology based solely on the trajectory of the moving object motion, and not also considering the shape of the moving object in recognizing a gesture, does not operate properly when the underlying assumption fails (e.g., the detected movement is not a hand). According to the approach of the present disclosure, only movement made with the hand are recognized, and only gestures made only with a particular hand pose (e.g., shape) are interpreted.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure. As used herein, the alphabetic designators such as "N" and "M," indicate that a number of the particular feature so designated can be included with examples of the present disclosure, particularly with respect to reference numerals in the drawings. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 116 may reference element "16" in FIG. 1, and a similar element may be referenced as 216 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates a computing apparatus suitable for creating and/or using a handwritten character font library according to embodiments of the present disclosure. The computing system 100 can be comprised of a number of computing resources communicatively coupled to the network 102. FIG. 1 shows a first computing device 104 that may also have an associated data source 106, and may have one or more input/output devices (e.g., keyboard, electronic display). A second computing device 108 is also shown in FIG. 1 being communicatively coupled to the network 102, such that executable instructions may be communicated through the network between the first and second computing devices.

Computing device 108 may include one or more processors 110 communicatively coupled to a non-transitory computer-readable medium 112. The non-transitory computer-readable medium 112 may be structured to store executable instructions 116 (e.g., one or more programs) that can be executed by the one or more processors 110 and/or data. The second computing device 108 may be further communicatively coupled to a production device 118 (e.g., electronic display, printer, etc.) and/or an image input device 114. The image input device 114 can be used to obtain images from which hand gestures can be recognized. The image input device 114 can be, for example, a camera which is capable of capturing a series of still images and/or streaming video in a digital format (e.g. providing pixel information). Second computing device 108 can also be communicatively coupled to an external computer-readable memory 119.

According to one or more embodiments, image input device 114 is a camera that provides color and range (e.g., depth) pixel information. For example, image input device 114 may provide two images, a color image and a depth (e.g., disparity) image. While a "color image," as used herein, may include an image limited to black and white and/or grayscale colors, generally it is intended that a color image is an image that includes colors other than or in addition to black and white and/or grayscale colors. The hand gesture recognition system of the present disclosure may be implemented using an image input device 114 such as a depth camera that provides a color image and a disparity image at each captured instant. Image input device 114 may also be implemented by a stereo camera configured to provide color and depth images, or another device(s) that can provide per pixel color-based and range-based images.

The second computing device 108 can cause an output to the production device 118, for example, as a result of executing instructions of one or more programs stored non-transitory computer-readable medium 112, by the at least one processor 110, to implement a handwritten character font library according to the present disclosure. Causing an output can include, but is not limited to, displaying text and images to an electronic display and/or printing text and images to a tangible medium (e.g., paper), in a handwritten font for example. Executable instructions to generate and/or manipulate fonts using handwritten characters may be executed by the first and/or second computing device 108, stored in a database such as may be maintained in external computer-readable memory 119, output to production device 118, and/or printed to a tangible medium.

First 104 and second 108 computing devices are communicatively coupled to one another through the network 102. While the computing system is shown in FIG. 1 as having only two computing devices, the computing system can be comprised of additional multiple interconnected computing devices, such as servers and clients. Each computing device can include control circuitry such as a processor, a state machine, application specific integrated circuit (ASIC), controller, and/or similar machine. As used herein, the indefinite articles "a" and/or "an" can indicate one or more than one of the named object. Thus, for example, "a processor" can include one processor or more than one processor, such as a parallel processing arrangement.

The control circuitry can have a structure that provides a given functionality, and/or execute computer-readable instructions that are stored on a non-transitory computer-readable medium (e.g., 106, 112, 119). The non-transitory computer-readable medium can be integral (e.g., 112), or communicatively coupled (e.g., 106, 119), to the respective computing device (e.g. 104, 108), in either in a wired or wireless manner. For example, the non-transitory computer-readable medium can be an internal memory, a portable memory, a portable disk, or a memory located internal to another computing resource (e.g., enabling the computer-readable instructions to be downloaded over the Internet). The non-transitory computer-readable medium 330 can have computer-readable instructions stored thereon that are executed by the control circuitry (e.g., processor) to provide a particular functionality.

The non-transitory computer-readable medium, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), among others. The non-transitory computer-readable medium can include optical discs, digital video discs (DVD), high definition digital versatile discs (HD DVD), compact discs (CD), laser discs, and magnetic media such as tape drives, floppy discs, and hard drives, solid state media such as flash memory, EEPROM, phase change random access memory (PCRAM), as well as other types of machine-readable media.

Figure 2:
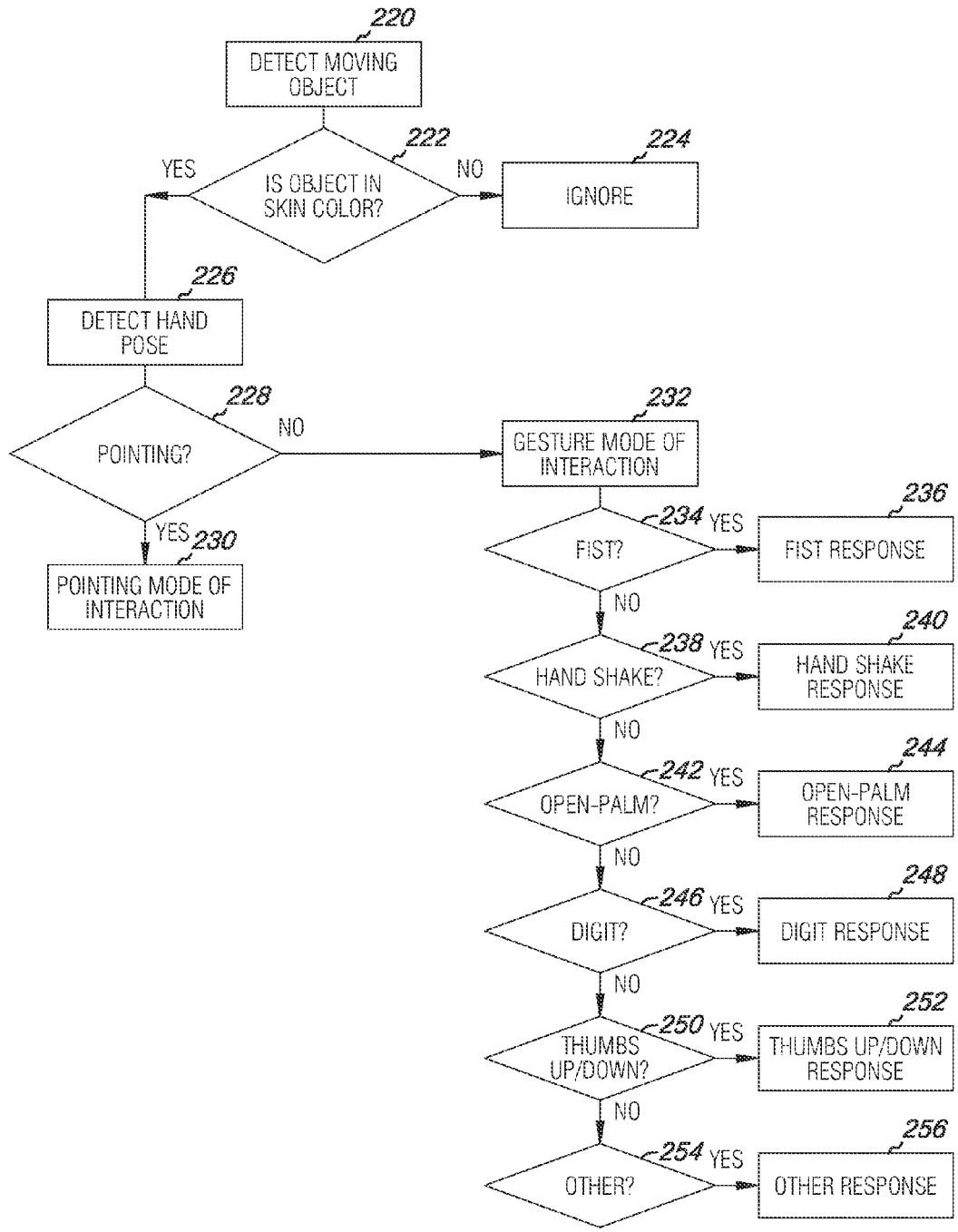
FIG. 2 is a flow chart illustrating a method for hand gesture recognition according to the present disclosure.

FIG. 2 is a flow chart illustrating a method for hand gesture recognition according to the present disclosure. The method described below can be implemented by a hand gesture recognition system, such as that illustrated in FIG. 1. Within a scene being captured by an image input device, a moving object can initially be detected 220 within the scene. The moving object may, or may not, be a hand. That is, the moving object may be a non-hand object moving through the background of the scene. The scene, as used herein, includes a 2-dimensional area defined by a height and width from which a lens of the image input device has in view, such as a conventional camera image might include. However, embodiments of the present disclosure can also limit the scene to a particular depth range, for example by adjustment of an appropriate focus depth of a lens system used by the image input device, by use of a depth camera (as is discussed further below), and/or by other range finding/defining mechanisms.

One or more embodiments of the present disclosure can utilize optical flow for detecting 220 moving objects in a scene. For example, after an initial thresholding based on disparity values, the moving object from the image of the scene is found and segmented. A color analysis of the moving object (e.g., blob) is performed, as illustrated at 222. The moving object is referred to as a blob since pose recognition occurs after color analysis; therefore, the detected moving object may be a hand or may not be a hand. For example, the moving object upon which color analysis is performed may be a moving person, non-hand body part, animal, and/or inanimate object. The object detected as moving may also actually be not moving, but appear to be moving if the image input device is following a moving object so that the moving object appears to be stationary while the balance of the scene appears to be moving relative thereto.

The color analysis can include determining a quantity of skin colored pixels in the segmented moving object and/or comparing the quantity skin colored pixels to a threshold quantity associated with the moving object being skin colored (e.g., a human body portion). Determining skin color (e.g., skin colored pixels) is discussed further below. If the blob does not have a sufficient number of skin colored pixels, the blob is considered to not be a hand and is ignored, as illustrated at 224. That is, the movement of the blob is not analyzed further until color analysis indicates the blob to be skin colored. Skin color analysis can be used, for example, to distinguish movement of a hand from movement of an inanimate object in front of the image input device. While inanimate objects may have some pixels that are skin colored, the relative quantity (e.g., proportion of pixels with respect to all pixels of the moving object) will likely be less than the quantity of skin color pixels expected for a hand.

In some embodiments, continued movement can be further analyzed (e.g., periodically analyzed) for skin color, while in other embodiments, continued movement of the blob through the image of the scene is ignored (e.g., once color analysis determined the moving object is not skin colored, it is subsequently ignored and no further color analysis is conducted).

If the blob has significant number of skin colored pixels (e.g., a sufficient quantity with respect to a threshold quantity), the blob is considered to be a hand, and hand gesture recognition analysis proceeds to recognize the pose of the hand, as shown at 226. According to one or more embodiments of the present disclosure, the threshold quantity of skin colored pixels is proportional to the relative size of the segmented moving object with respect to the balance of the image of the scene. That is, a certain proportion of the pixels of the segmented moving object are required to be skin colored. For example, the closer the moving object is to the image input device, the larger the moving object will appear relative to the balance of the image of the scene and the greater the quantity of pixels that will be involved in the image of the segmented moving object. Therefore, the threshold quantity of skin colored pixels is larger than for a moving object located further away from the image input device and that has a resulting smaller segmented image. According to other embodiments, the threshold quantity of skin colored pixels is an absolute quantity that is independent of segment proportionalities.

As used herein, a gesture includes a pose and trajectory. That is, a hand gesture is defined to mean a hand pose and trajectory of the hand pose. According to some embodiments, hand pose detection (e.g., determining the configuration of the hand) first involves determining whether the hand is in a pointing hand pose, as illustrated at 228 in FIG. 2. Various hand poses, and recognition thereof, are further discussed with respect to FIG. 4A-5G below. If the hand pose is determined to be a pointing hand pose (e.g., index finger held out and other fingers curled into a fist), a pointing mode of interaction is implemented, as shown at 230. The pointing mode of interaction causes an on-screen cursor to move corresponding to the movement of the user's pointing hand gesture. According to various embodiments, an interaction mode of the hand gesture recognition system can be determined from recognition of a hand pose, trajectory, and/or combination thereof (e.g., hand gesture). The interaction mode initiated corresponds to the recognized hand gesture, hand pose, and/or trajectory.

According to one or more embodiments, If the hand pose is not determined to be a pointing hand pose, a gesture mode of interaction is implemented, as shown at 232. Further hand pose recognition processing can be implemented to determine if the hand pose is recognized as a fist hand pose 234, a hand shake hand pose 238, an open-palm hand pose 242, a digit hand pose 246, a thumbs up or down hand pose 250, or some other hand pose 254. If the hand pose is determined to be (e.g., recognized as) a fist hand pose, then a fist response 236 is implemented. If the hand pose is recognized as a hand shake hand pose, then a hand shake response 240 is implemented. If the hand pose is recognized as an open-palm hand pose, then an open-palm response 244 is implemented. If the hand pose is recognized as a digit hand pose, then a digit response 248 is implemented. If the hand pose is recognized as a thumb up/down hand pose, then a thumbs up/down response 252 is implemented. If the hand pose is recognized as an other hand pose, then an other response 256 is implemented.

Although FIG. 2 is illustrated using several specific hand pose configurations, the methodology and systems of the present disclosure are not limited to those illustrated, and may be implemented using additional hand poses and/or include only a subset of the particular hand poses discussed with respect to FIG. 2. For example, one embodiment of the present disclosure may be implemented utilizing all the hand poses shown in FIG. 2 except the open-palm hand pose and may also be implemented with one additional hand pose not shown in FIG. 2.

Although not shown in FIG. 2, the respective response corresponding to a hand pose can include processing to further recognize the hand pose. For example, the digit response 248 can include further processing to ascertain which of several digit hand poses is being used (e.g., a hand pose utilizing a particular one of several possible digit positions), the thumbs up/down response 252 can include further processing to recognize a thumbs up or thumbs down hand pose, and/or a particular response can include further processing to ascertain a particular orientation or other characteristic of the respective hand pose.

The other hand pose recognition 254, can be implemented so as to be recognition of another particular hand pose and/or can be implemented so as to be failure to recognize any of the hand pose(s) specifically recognized by the implemented hand gesture recognition system (e.g., if no hand gestures are recognized). For example, if no hand gestures are recognized, no further action may be taken, or further processing may be taken to recognize a particular hand pose (e.g., loop back to detect hand pose 228). Responses corresponding to particular recognized hand poses can include determination of trajectory (as discussed further with respect to FIG. 3) and/or taking other processing in response to hand pose and/or trajectory.

While FIG. 2 indicates one sequence of hand gesture recognition, embodiments of the present disclosure are not limited to the particular sequence illustrated in FIG. 2. That is, detection of a moving object, skin color analysis, hand pose recognition, and/or hand trajectory processing can be accomplished in an alternative order to that shown in FIG. 2. As one example, rather than making an initial determination with respect to a pointing hand gesture 228 before entering a gesture mode of interaction 232, a pointing hand gesture may be determined as one of several other hand poses, with the associated response being a pointing response that includes a pointing mode of interaction as previously described. Other deviations from the methodology illustrated with respect to FIG. 2 can include, but are not limited to, determining trajectory before determining hand pose and/or skin color, determining skin color before detecting movement, and/or any other re-ordering of the image processing, as may be appropriate to a particular application of the hand gesture recognition system.

Figure 3:
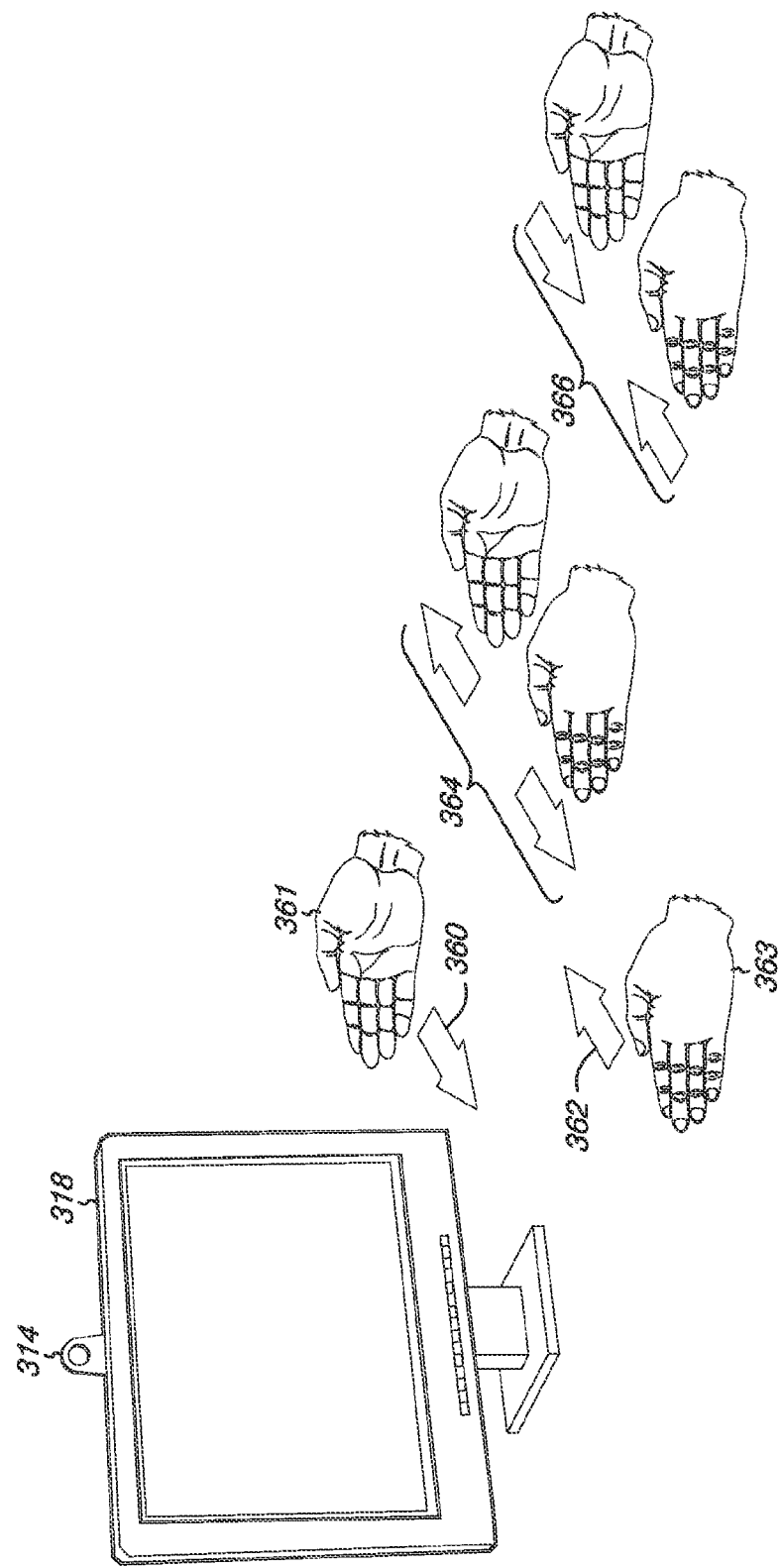
FIG. 3 illustrates hand gestures which may be recognized according to the present disclosure.

FIG. 3 illustrates hand gestures which may be recognized according to the present disclosure. Hand gestures are defined as a combination of a hand pose and trajectory (e.g., movement) of that hand pose. Certain hand poses are discussed below with respect to FIGS. 5A-5G. FIG. 3 uses right 361 and left 363 hand shake poses to illustrate the following trajectory discussions. However, the trajectory aspects presented here may be conducted by, and interpreted for, any other hand poses as well, such as those discussed with respect to FIGS. 5A-5G.

Some embodiments of a hand recognition system can include an image input device 314 (e.g., digital camera) mounted atop a production device 318, such as an electronic display, so that a user can simultaneously view the electronic display 318 as hand gestures are being captured by the image input device 314. FIG. 3 shows movement of a hand pose to the left 360 (e.g., in a first horizontal direction); movement of a hand pose to the right 362 (e.g., in a second horizontal direction); dual movement of hand poses apart 364 (e.g., simultaneous movement of the hand poses in opposite horizontal directions away from one another); and dual movement of hand poses together 366 (e.g., simultaneous movement of the hand poses in opposite horizontal directions toward one another).

Embodiments of the present disclosure are not limited to the trajectories shown in FIG. 3, and may include other hand pose trajectories such as vertical in an upward direction, vertical in a downward direction, together in a vertical direction, apart in a vertical direction, towards the image input device 314 (e.g., in one direction of a depth dimension), away from the image input device 314 (e.g., in a second, opposite, direction in the depth dimension), together in a depth dimension, apart in a vertical dimension, in a geometric shape motion (e.g., circular, diagonal), and/or other movement patterns that can be distinguished from other trajectories.

According to various embodiments, different hand pose and trajectories can be mapped to the same or different responses. Same hand poses with different trajectories can be mapped to a same response (e.g., action). For example, a hand gesture response can be determined solely by a hand pose (e.g., irrespective of trajectory). Similar hand poses can be mapped to a common response. For example, a right hand shake 361 hand pose moving in a left horizontal trajectory 360 may be mapped to a same response as a right hand shake 361 hand pose moving in a right horizontal trajectory 362, a left hand shake 363 hand pose moving in a right horizontal trajectory 362, and/or a left hand shake 363 hand pose moving in a left horizontal trajectory 360.

According to various embodiments, same hand poses with different trajectories can be mapped to different responses. For example, a right hand shake 361 hand pose moving in a left horizontal trajectory 360 can be mapped to a different response than the right hand shake 361 hand pose moving in a right horizontal trajectory 362. For example, the act of moving a hand from left to right using a hand-shake pose can be interpreted as a go-to next instruction, while the act of moving a hand from right to left using a hand-shake hand pose can be interpreted as go-to previous.

Repeating a hand pose moving in a particular trajectory may be accomplished by returning the hand pose to a starting position of a particular trajectory outside the image of the scene observed by the image input device 314, or by using a different hand pose for the return trajectory (e.g., to an unrecognized hand pose). For example, moving a right hand shake 361 hand pose only in a left horizontal trajectory 360 (e.g., without moving the right hand shake pose back to the right in preparation to begin another left horizontal trajectory 360) can be accomplished by changing the hand pose during a return right trajectory (e.g., different than a right hand shake hand pose) and/or by moving the right hand shake outside the image of the scene being sensed by the image input device.

According to various embodiments, different hand poses with same trajectories can be mapped to same responses, or different hand poses with different trajectories can be mapped to a same response. For example, a hand gesture response can be determined by solely by trajectory (e.g., irrespective of hand pose). That is, any hand poses moving apart 364 may be mapped to a particular response (e.g., zooming in). According to another example, the act of moving a hand from right to left, or from left to right using an open palm hand pose can be interpreted as a gesture for panning, rather than the go-to instructions associated with the same trajectory but implemented with the hand shake hand pose described above.

It will be appreciated that other combinations of hand poses and/or trajectories can be mapped to same or different responses. It will also be appreciated that some hand pose and trajectory combinations can be mapped to same responses while other hand pose and trajectory combinations can be mapped to different responses. Any combination of hand poses and/or trajectories can be mapped to same and/or different responses as may be beneficial to an application of the hand gesture recognition system and methodology of the present disclosure.

Figure 4A:
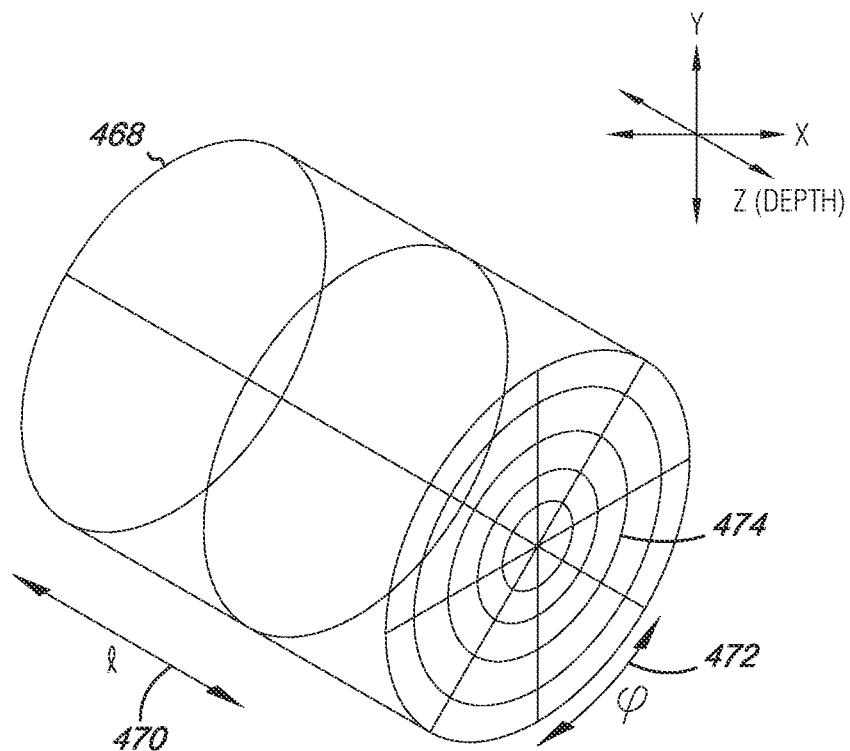
FIGS. 4A and 4B illustrate a cylindrical volumetric shape descriptor according to the present disclosure.
Figure 4B:
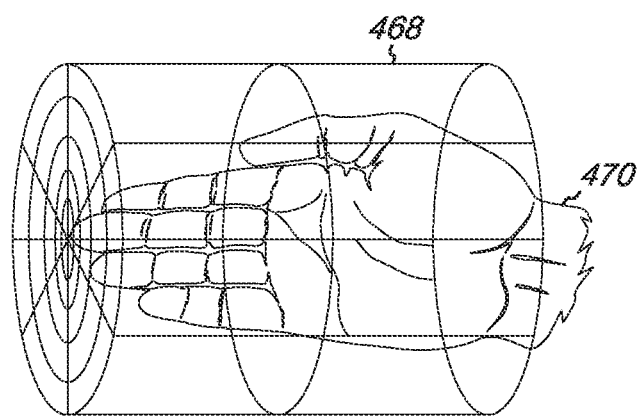

FIGS. 4A and 4B illustrate a cylindrical volumetric shape descriptor according to the present disclosure. Hand pose is a particular configuration of a hand, and can include direction and orientation of the hand in space, as well as arrangement of the fingers and thumb. Various hand poses are illustrated with respect to FIG. 5A-5G. According to the present disclosure, appearance of a hand, in determining a hand pose, is based on discrimination. Data can be pre-collected of various hand poses from one or more people, such as users of a hand recognition system, through image capture and digitization techniques. Collected data can include images from different viewing angles.

FIG. 4A illustrates a cylindrical volumetric shape descriptor 468. Embodiments of the present disclosure utilize a three-dimensional shape descriptor using depth values (e.g., as may be obtained using a depth camera). Locations within the cylindrical volumetric shape descriptor 468 can be uniquely described using a volumetric coordinate system including a length (l) coordinate 470 in conjunction with a polar coordinate system 474. The polar coordinate system 474 includes a radius dimension 473 and an angular dimension 472, as indicated by φ. Volume portions within the cylindrical volumetric shape descriptor 468 can be defined by ranges of each coordinate (e.g., l, r, φ).

Hand pose appearance can be based on discrimination. Each hand pose has quantifiable features particular to that hand pose, the features being those that differ from one hand pose to another such that hand poses can be discriminated from one another. For example, the features of a particular hand pose can include whether each particular sub-volume of the cylindrical volumetric shape descriptor 468 is occupied by the hand or not. A probabilistic support vector machine can be used for classification.

It will be appreciated from the discussions above that an object (e.g., a blob) detected as moving can be segmented from the image of a scene. According to one or more embodiments, the moving object can be segmented using the cylindrical volumetric shape descriptor 468 sized and/or orientated to contain the moving object (e.g., initially a blob since hand pose determination can be delayed until after skin color analysis is complete).

The cylindrical volumetric shape descriptor 468 can be used for performing the skin color analysis, for example, based on a given portion of the pixels of the blob segmented within the cylindrical volumetric shape descriptor 468 being determined to be skin color. Skin color analysis can also be performed based on a two-dimensional representation of the moving object.

FIG. 4B shows the cylindrical volumetric shape descriptor 468 overlayed on a hand in an example hand pose. The hand occupies some volume portions and does not occupy other volume portion of the cylindrical volumetric shape descriptor 468. Fine resolution can be achieved where the volume portions are defined to contain relatively small volumes. Thus, the occupation of each volume portion by the hand for each hand pose can be learned and determined digitally utilizing a three dimensional shape descriptor, such as the cylindrical volumetric shape descriptor 468. It will be appreciated that the volumetric shape descriptor 468 is not limited to any particular shape, and other configurations of volumes may be used with an appropriate corresponding coordinate system to uniquely identify particular sub-volumes within the volumetric shape descriptor.

In recognizing a hand pose, the cylindrical volumetric shape descriptor 468 can be sized to accommodate the moving object (e.g., due to the moving object actually being different sizes or appearing as a different size to due relative distance from the image input device), with further analysis based on first normalizing the volumetric shape descriptor (e.g., based on relative sub-volume portions locations with respect to the entire volume).

According to various embodiments, the hand gesture system of the present disclosure can be pre-trained (e.g., programmed) to recognize hand poses using data collected from a number (e.g., 8) of hand poses, as seen from different viewing angles in order to determine which sub-volume portions are typically occupied by a hand and which are not. The number of sample hand poses used to train the hand gesture recognition system is selected to provide a model sufficient to distinguish a particular hand pose form other hand poses. This may vary depending on the quantity of hand poses to be distinguished from one another and/or the similarity of the hand poses to one another. As the sub-volumes occupied for a particular hand pose can vary somewhat based on hand proportionalities, differing hand configurations for same hand poses between different users (e.g., fingers slightly apart versus tightly close together for a particular hand pose), hand orientation, and other differing hand characteristics, hand pose recognition can be based on a threshold where some proportion of sub-volumes of expected occupied sub-volumes associated with a particular hand pose are needed to determine a particular hand pose.

For more customization, a particular user may train the hand gesture recognition system using their particular hands. For example, a user may be directed to perform particular combinations of hand pose and trajectories for training purposes, in a similar fashion to a user training a voice recognition system to recognize a particular user's voice characteristics.

Figure 5A:
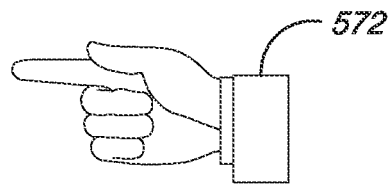
FIGS. 5A-5G illustrate various hand poses which may be recognized according to the present disclosure.
Figure 5B:
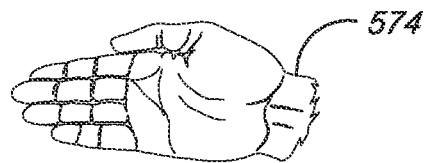
Figure 5C:
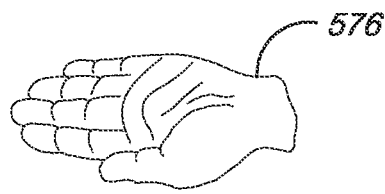

FIGS. 5A-5G illustrate various hand poses which may be recognized according to the present disclosure. FIG. 5A illustrates a pointing hand pose, generally with an index finger extended and middle, ring, and pinky fingers curled back toward the palm. FIG. 5B illustrates a hand shake hand pose, generally with all fingers extended, as is customary for inviting an exchange of a hand shake (e.g., hand clasp) with another. The fingers are generally aligned in a vertical orientation. FIG. 5C illustrates an open palm hand pose, generally similar to a hand shake hand pose, but rotated approximately 90 degrees such that the palm is oriented facing upward.

Figure 5D:
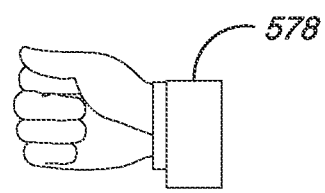
Figure 5E:
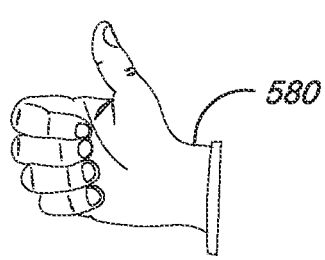
Figure 5F:
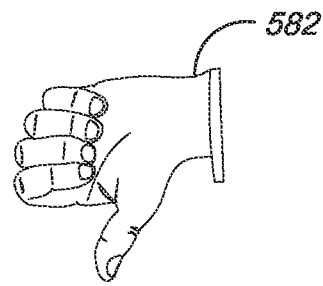

FIG. 5D illustrates a fist hand pose, generally similar to a pointing hand pose, but with all fingers curled, including the index finger. FIG. 5E illustrates a thumbs-up hand pose, generally similar to a fist hand pose, but with the thumb extending in an upward direction. FIG. 5F illustrates a thumbs-down hand pose, generally similar to a thumbs-up hand pose, but with the hand rotated approximately 180 degrees such that the thumb extends in a downward direction.

Figure 5G:
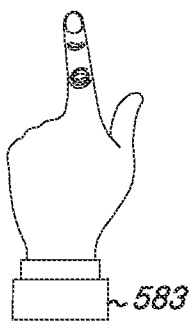

FIG. 5G illustrates a digit hand pose, generally similar to a pointing hand pose, but rotated approximately 90 degrees such that one or more fingers are extending upward. While the digit hand pose is shown with the index finger extended, the digit hand pose is not so limited, and may be defined to include more and/or other fingers. Alternatively, several digit hand poses may be separately defined, such as an index digit hand pose where only the index finger extended (e.g., as shown in FIG. 5G), a middle digit hand pose where only the middle finger is extended, etc.

While hand poses are illustrated in FIGS. 5A-5G with one of a left or right hand, a hand pose may be defined being formed with either hand, only a right hand, or only a left hand. For example, a right hand fist hand pose may be separately defined from a left hand fist hand pose. Alternatively, a fist hand pose may be defined to include either a right hand fist or a left hand fist. Also, one or more embodiments of the present disclosure may include additional hand poses to those shown in FIGS. 5A-5G (e.g., sign language alphabet hand poses), and/or be limited to less than all of the hand poses shown in FIGS. 5A-5G.

Figure 6A:
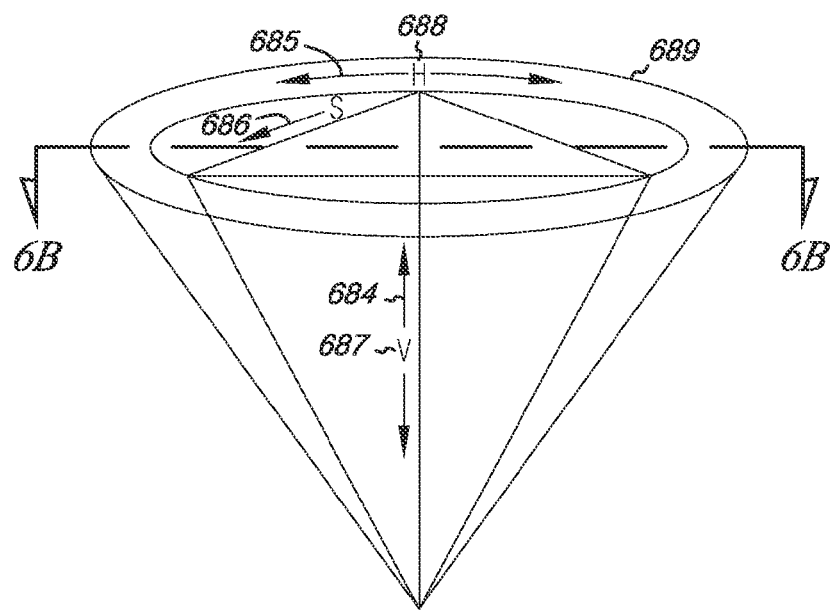
FIGS. 6A and 6B illustrate a skin color detection range according to the present disclosure.
Figure 6B:
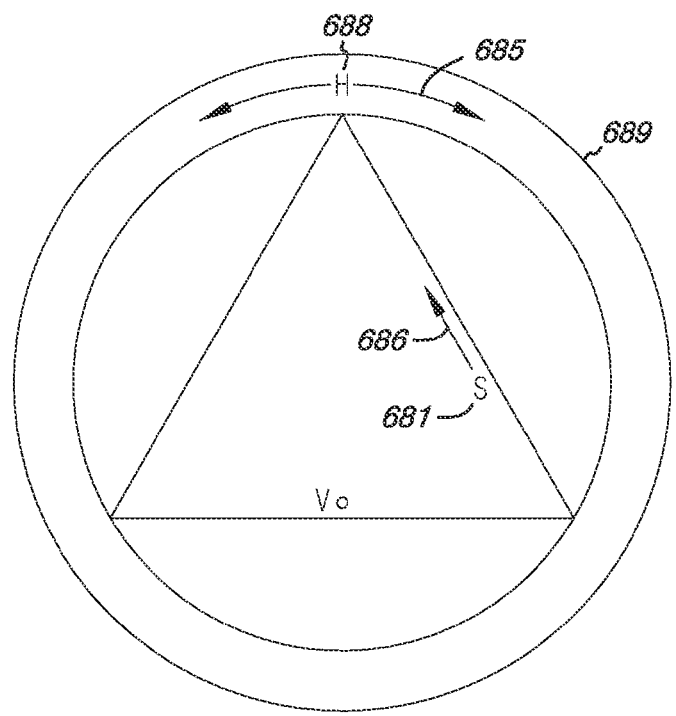

FIGS. 6A and 6B illustrate a skin color detection range according to the present disclosure. According to one or more embodiments of the present disclosure, an HSV color space can be used in the skin color analysis, corresponding to hue 688, saturation 681, and value 687 respectively. The HSV color space is a commonly known cylindrical-coordinate representation of points in an RGB (red, green, blue) color model, which rearrange the geometry in an attempt to be more perceptually relevant than a Cartesian representation. However, embodiments of the present disclosure are not limited to the HSV color space, and the hand gesture may be implemented utilizing other techniques, including but not limited to HSL (hue, saturation, lightness), HSB (hue, saturation, brightness), HSI (hue, saturation, intensity), or any other convenient color space arrangement.

In each cylinder 689, the angle 685 around the central vertical axis corresponds to "hue" 688, the distance 686 from the axis corresponds to "saturation" 681, and the distance 684 along the axis corresponds to "value" 684, "lightness," or "brightness". Note that while "hue" in HSL and HSV refers to the same attribute, their definitions of "saturation" differ dramatically. Because HSL and HSV are simple transformations of device-dependent RGB models, the physical colors they define depend on the colors of the red, green, and blue primaries of the device or of the particular RGB space, and on the gamma correction used to represent the amounts of those primaries. Each unique RGB device therefore has unique HSL and HSV spaces to accompany it, and numerical HSL or HSV values describe a different color for each basis RGB space.

According to one or more embodiments, skin color analysis can be accomplished using a Gaussian model of hue learned from skin images. Again, training of the hand gesture recognition system with respect to skin color can be performed based on a sampling of generic skin colors or based upon the coloring of a specific user's hands, the user providing sample images of their hands from which color ranges and/or values are learned. The range of colors that are considered "skin color" is set so as to enable distinguishing moving objects as hands from the background scene. As discussed above, according to various embodiments, gesture recognition progresses only if the moving object (e.g., blob) is determined to be skin color, and thus assumed to be a hand (although a hand pose may or may not be recognizable).

According to certain embodiments, a moving object may be segmented from the background scene using depth map thresholding (e.g., in lieu of or in addition to volumetric shape descriptor segmentation). Depth map thresholding can be accomplished using a depth camera providing pixel range information. That is, gesture recognition can be limited to certain ranges. The range limitations may be determined dynamically (e.g., at the time a moving object is detected).

For example, gestures recognition may be restricted to those hand gestures made away from a user's body (e.g., hands toward the camera), and or in a specified interaction volume, such as 0-3 feet from the camera. Pixel range information can be used to filter pixels outside a specified interaction volume range and/or filter concentrations of pixels that are located at different distances from one another. That is, a histogram of pixel depth versus pixel count of an image of a user located in front of a depth camera image input device with hands extended out from the body and toward the camera would indicate a first concentration of pixel depths at a first closer distance corresponding to the pixels capturing the hand and a second concentration of pixel depths at a second distance further away than the first distance corresponding to the pixels capturing the body, and perhaps a third concentration of pixel depths at a third furthest away distance corresponding to the pixels capturing the distant background. Then, gesture recognition can be limited to those pixels having a depth in the range of the first concentration of pixel depths to further aid distinguishing hands from other portions of an image.

Figure 7:
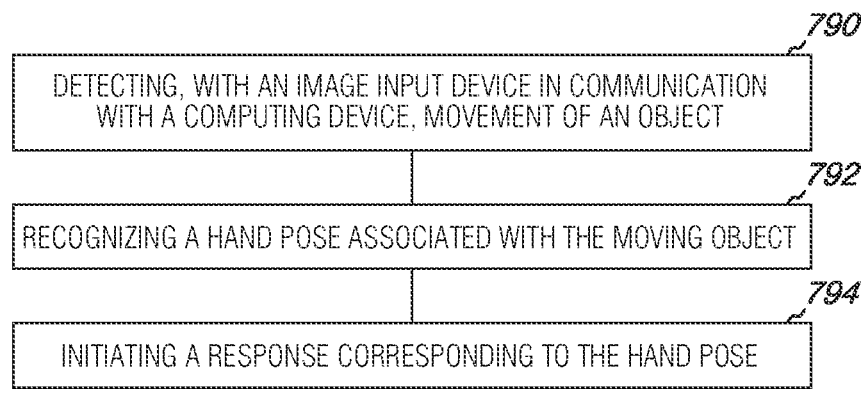
FIG. 7 is a flow chart illustrating a method for recognizing hand gestures according to the present disclosure.

FIG. 7 is a flow chart illustrating a method for recognizing hand gestures according to the present disclosure. The method for hand gesture recognition illustrated in FIG. 7 includes detecting 790, with an image input device in communication with a computing device, movement of an object. A hand pose associated with the moving object is recognized 792 and a response corresponding to the hand pose is initiated 794.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

Various examples of the system and method for collaborative information services have been described in detail with reference to the drawings, where like reference numerals represent like parts and assemblies throughout the several views. Reference to various examples does not limit the scope of the system and method for displaying advertisements, which is limited just by the scope of the claims attached hereto. Additionally, any examples set forth in this specification are not intended to be limiting and merely set forth some of the many possible examples for the claimed system and method for collaborative information services.

Throughout the specification and claims, the meanings identified below do not necessarily limit the terms, but merely provide illustrative examples for the terms. The meaning of "a," "an," and "the" includes plural reference, and the meaning of "in" includes "in" and "on." The phrase "in an embodiment," as used herein does not necessarily refer to the same embodiment, although it may.

In the foregoing Detailed Description, some features are grouped together in a single embodiment for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for hand-gesture recognition, comprising:
    detecting, with an image input device in communication with a computing device, movement of an object;
    determining whether the object is a hand by directly employing a hue model learned from a plurality of images of generic skin color;
    recognizing a hand pose associated with the moving object; and
    initiating a response corresponding to the hand pose.

2. The method of claim 1, further comprising:
   determining a color of the moving object; and
   enabling recognition of the hand pose associated with the moving object if the color is determined to be substantially within a range of skin colors,
   wherein recognizing the hand gesture includes recognizing the hand pose and a trajectory of the hand.

3. The method of claim 1, further comprising enabling recognition of a hand pose associated with the moving object if the color is determined to be substantially within a range of skin colors, wherein recognizing the hand gesture includes recognizing the hand pose and determining a trajectory of the hand pose.

4. The method of claim 1, wherein pixels from the image input device associated with the object having range information outside of a defined interaction volume with respect to the image input device are ignored.

5. The method of claim 1, further comprising:
   initiating one mode of operation for the hand pose being classified as corresponding to a pointing hand pose; and
   initiating another mode of operation for the hand pose not being classified as corresponding to a pointing hand pose.

6. The method of claim 5, wherein the another mode of operation includes:
   initiating a fist response corresponding to for the hand pose being classified as corresponding to a fist gesture;
   initiating a hand shake response corresponding to for the hand pose being classified as corresponding to a hand shake gesture;
   initiating an open-palm response corresponding to for the hand pose being classified as corresponding to an open-palm gesture;
   initiating a digit response corresponding to for the hand pose being classified as corresponding to a digit gesture;
   initiating a thumbs up response corresponding to for the hand pose being classified as corresponding to a thumbs up gesture;
   initiating a thumbs down response corresponding to for the hand pose being classified as corresponding to a thumbs down gesture; and
   initiating an other response corresponding to for the hand pose not being classified as corresponding to any of the aforementioned gestures.

7. The method of claim 5, wherein the one mode of operation includes moving a cursor displayed on a production device in a direction and distance corresponding to movement of the pointing hand pose.

8. The method of claim 1, wherein detecting movement of the object is based on an optical flow analysis that includes initial thresholding based on disparity values associated with each pixel of the image input device.

9. The method of claim 7, further comprising:
   after initial thresholding, segmenting the object detected as moving from a background scene, and
   evaluating a color of the object including measuring a quantity of pixels producing a color in the range of skin colors and comparing the quantity of pixels to a threshold quantity.

10. The method of claim 8, wherein segmenting the object includes dynamic use of depth map thresholding in filtering pixels of the image input device outside a given depth range associated with an observed closest peak concentration of pixels.

11. The method of claim 1, wherein the first mode of operation includes moving a cursor in relation to the detected movement of the object, the cursor being displayed on a production device communicatively coupled to the computing device.

12. A hand gesture recognition system, comprising:
   a computing device having at least one processor;
   an image input device communicatively coupled to the computing device, the image input device providing per pixel color information and pixel range information;
   a production device communicatively coupled to the computing device; and
   a non-transitory computer-readable medium having computer-readable instructions stored thereon that, if executed by the at least one processor, cause the at least one processor to:
   detect a moving object within an interaction zone of the image input device;
   evaluate color of the moving object from the color information;
   enable hand gesture recognition of the moving object evaluated as exceeding a threshold portion of a particular color, the hand gesture recognition to continuously attempt to recognize a hand gesture associated with the moving object as any of a plurality of hand gestures associated with different operations, directly responsive to the moving object exceeding the threshold portion; and
   wherein hand gesture recognition includes hand pose and moving object trajectory determinations, and wherein the interaction zone is defined at least in terms of the range information.

13. The system of claim 12, wherein the image input device is a depth camera providing a color image and a disparity image.

14. The system of claim 12, wherein the computer-readable instructions further cause the at least one processor to implement a probabilistic support vector machine utilized to classify hand gestures.

15. A non-transitory computer-readable medium having computer-readable instructions stored thereon that, if executed by one or more processors, cause the one or more processors to:
   detect, with an image input device in communication with a computing device, movement of an object;
   evaluate a color of the object with respect to a range of skin colors in direct conjunction with a hue model learned from a plurality of images of generic skin colors; and
   enable recognition of a hand gesture if the color of the object is within the range of skin colors the recognition to continuously attempt to recognize the hand gesture associated with the object as any of a plurality of hand gestures associated with different operations, directly responsive to the color of the object being within the range of skin colors.

* * * * *

UNITED STATES PATENT AND TRADEMARK OFFICE
CERTIFICATE OF CORRECTION

PATENT NO. : 8,768,006 B2  Page 1 of 1
APPLICATION NO. : 12/977065
DATED : July 1, 2014
INVENTOR(S) : Anbumani Subramanian et al.

It is certified that error appears in the above-identified patent and that said Letters Patent is hereby corrected as shown below:

In the Claims

Column 12, line 64, in Claim 1, delete "color;" and insert -- colors; --, therefor.

Column 13, line 42, in Claim 6, delete "an other" and insert -- another --, therefor.

Signed and Sealed this
Seventh Day of October, 2014

Michelle K. Lee
*Deputy Director of the United States Patent and Trademark Office*